United States Patent
Haruyama et al.

(10) Patent No.: US 8,479,861 B2
(45) Date of Patent: Jul. 9, 2013

(54) TRAVELLING CONTROL APPARATUS OF COMPACTION VEHICLE

(75) Inventors: Nobuyuki Haruyama, Hatogaya (JP);
Takabumi Tezuka, Kita-Katsushika-gun (JP); Masayuki Yoshida, Kita-Katsushika-gun (JP)

(73) Assignee: Sakai Heavy Industries, Ltd., Tokyo (JP)

( * ) Notice: Subject to any disclaimer, the term of this patent is extended or adjusted under 35 U.S.C. 154(b) by 734 days.

(21) Appl. No.: 12/532,069

(22) PCT Filed: Mar. 18, 2008

(86) PCT No.: PCT/JP2008/054950
§ 371 (c)(1),
(2), (4) Date: Sep. 18, 2009

(87) PCT Pub. No.: WO2008/123061
PCT Pub. Date: Oct. 16, 2008

(65) Prior Publication Data
US 2010/0042298 A1    Feb. 18, 2010

(30) Foreign Application Priority Data
Mar. 20, 2007  (JP) .................................. 2007-072212
Mar. 28, 2007  (JP) .................................. 2007-083489

(51) Int. Cl.
*B60K 28/16*  (2006.01)
(52) U.S. Cl.
USPC ............................... 180/197; 701/82; 701/90
(58) Field of Classification Search
USPC ................... 180/197; 701/50, 82, 90
See application file for complete search history.

(56) References Cited

U.S. PATENT DOCUMENTS

| | | | | |
|---|---|---|---|---|
| 4,939,656 A | * | 7/1990 | Hoashi et al. | 701/83 |
| 5,915,492 A | * | 6/1999 | Yates et al. | 180/197 |
| 7,529,611 B2 | * | 5/2009 | Tseng et al. | 701/82 |

FOREIGN PATENT DOCUMENTS

| | | |
|---|---|---|
| JP | 62-72307 U | 5/1987 |
| JP | 5-280010 A | 10/1993 |
| JP | 7-150516 A | 6/1995 |
| JP | 2001-146928 A | 5/2001 |
| JP | 2003-306051 A | 10/2003 |
| JP | 2005-279364 A | 10/2005 |

OTHER PUBLICATIONS

International Search Report dated Jul. 1, 2008 including English translation (Five (5) pages).

\* cited by examiner

*Primary Examiner* — Alicia Torres
(74) *Attorney, Agent, or Firm* — Crowell & Moring LLP (57) ABSTRACT

A travelling control apparatus 1 includes: rotational speed ratio detection units 2 configured to output signals S1, S2 of respective rotational speeds of front and rear wheels; a rotational speed ratio calculation measure 3 for calculating data Da of a rotational speed ratio of the wheels from the signals S1, S2; a rotational speed ratio sort measure 4 for sorting the data Da into data D1 within a range of a set range T1 and data D2 out of the range; a reference data generation measure 5 for averaging the data D1 and generating an average value thereof as reference data Ds; and a slip determination measure 6 for comparing data $Da_1$ of the rotational speed ratio of the wheels with the reference data Ds, and in a case of the data $Da_1$ being out of a set range T2, for determining that one of the wheels is slipping.

4 Claims, 6 Drawing Sheets

TRAVELLING CONTROL APPARATUS OF COMPACTION VEHICLE

TECHNICAL FIELD

The present invention relates to a travelling control apparatus of a compaction vehicle used in a compaction of ground.

BACKGROUND ART

Generally, in a compaction vehicle are prepared a plurality of kinds of rolls, tires, and the like in accordance with an application and condition of a compaction, and different articles are attached to a front wheel and a rear wheel in some cases; therefore, there exist many variations of vehicle kinds according to a difference of their combination.

Figure 7A:
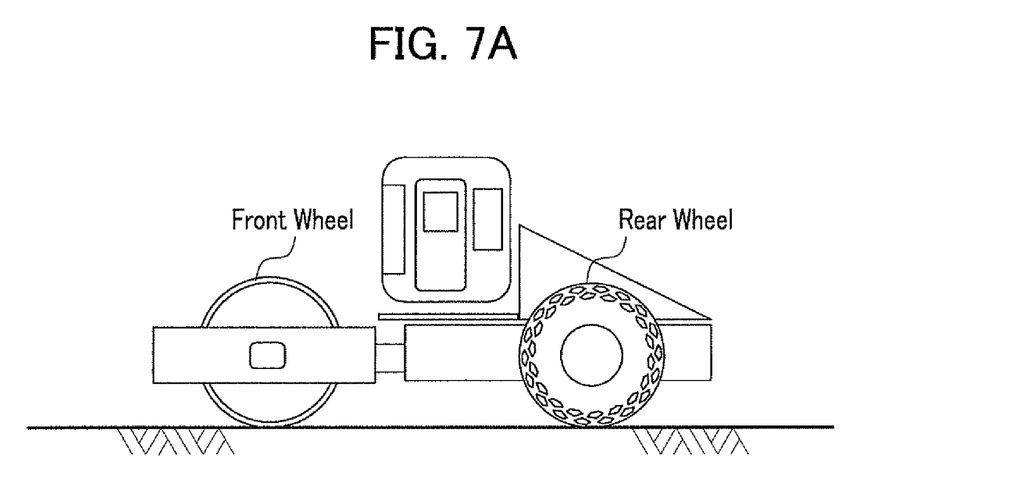
FIGS. 7A and 7B are side views showing compaction vehicles often used in a compaction of uneven ground.
Figure 7B:
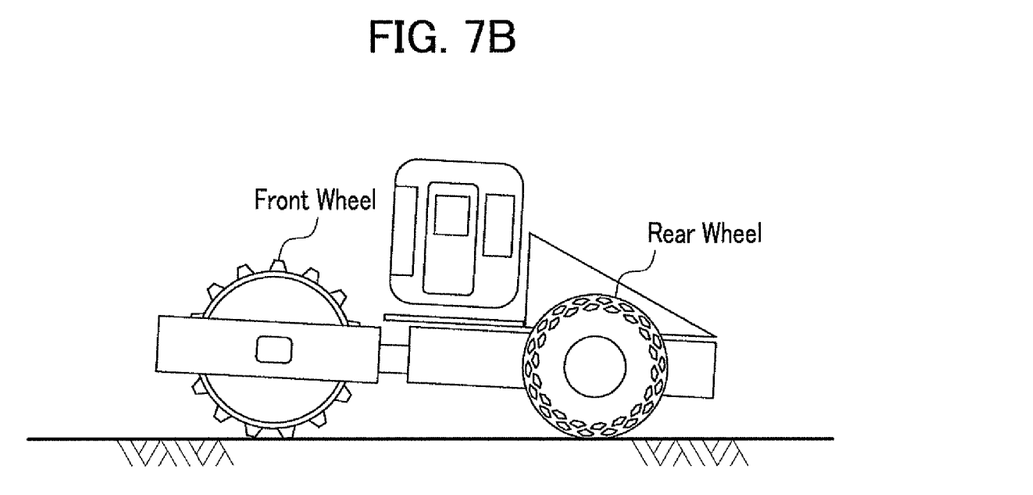

FIGS. 7A and 7B are side views showing compaction vehicles often used in a compaction of uneven ground; FIG. 7A shows a vehicle kind where tires are attached as a rear wheel, and a smooth roll is attached as a front wheel; and FIG. 7B shows a vehicle kind where a tamping roll of a large diameter is attached instead of the smooth roll. As a compaction vehicle used in such uneven ground, there is the vehicle where a control apparatus is mounted for determining a slip state from a change of a ratio of respective rotational speeds (rotations per unit time) of front and rear wheels, and for reducing a rotational speed of a slipping wheel, when a front wheel or rear wheel thereof slips in a slush and the like.

According to a conventional control apparatus, a rotational speed ratio is obtained from a ratio of diameters of front and rear wheels, and the ratio is preset as a fixed reference rotational speed ratio. Because each compaction vehicle of FIGS. 7A and 7B has a different rotational speed ratio with each other, the rotational speed ratio of a different value is preset. Then at the same time, a set range determined to be in a non-slip state, that is, an upper limit value and lower limit value of the reference rotational speed ratio are preset as fixed values, respectively. When a rotational speed ratio monitored is out of range of the upper limit value or the lower limit value in a compaction and the like, it is determined that one of the front and rear wheels is slipping. In addition, because the applicants cannot find a proper patent document about a conventional control apparatus applied to a compaction vehicle and monitoring a rotational speed ratio of front and rear wheels, the applicants cite Japanese Patent Laid-Open Publication No. 2001-146928 whose technology eliminates a slip between left and right drive wheels.

DISCLOSURE OF THE INVENTION

According to the conventional control apparatus, with respect to the reference rotational speed ratio, a manual input work for every vehicle kind is necessary such as setting input for each vehicle kind in a stage of manufacturing the control apparatus or setting input in accordance with a kind of front and rear wheels in a stage of the control apparatus being mounted on a vehicle in its assembly site. Accordingly, the conventional control apparatus has a problem of requiring a control apparatus different in specification for every kind of a compaction vehicle, a problem of an input error by a site worker, and the like. Furthermore, when an air pressure of a tire is reduced, a tire diameter becomes small, and an actual rotational speed ratio is different from a set rotational speed ratio, there is also a possibility that a deviance of a slip state determined by a control apparatus occurs with respect to an actual slip.

The present invention is originated in order to solve such a problem, and an object of the invention is to provide a travelling control apparatus of a compaction vehicle excellent in versatility and by which the slip determination accuracy is well maintained.

In order to solve the problem, the invention is a travelling control apparatus of a compaction vehicle for compacting ground, the apparatus comprising: rotational speed ratio detection units configured to detect respective rotational speeds of front and rear wheels and to output signals S1, S2 of the rotational speeds; a rotational speed ratio calculation means for calculating data Da of a rotational speed ratio of the front and rear wheels from the signals S1, S2; a rotational speed ratio sort means for sorting the data Da into data D1 within a range of a set range T1 and data D2 out of the range; a reference data generation means for averaging the data D1 and generating an average value of the data D1 as reference data Ds; and a slip determination means for comparing data $Da_1$ of the rotational speed ratio of the front and rear wheels obtained from currently obtained signals S1, S2 with the reference data Ds, and in a case of the data $Da_1$ being out of a set range T2, for determining that one of the front and rear wheels is slipping.

According to the travelling control apparatus, the following effects are obtained:

(1) Because the reference data Ds of a reference of the slip determination is automatically set in accordance with the rotational speed ratio of the front and rear wheels, a travelling control apparatus of a same specification can be applied to each compaction vehicle whose rotational speed ratio of the front and rear wheels is different. Thus, a management manpower of the travelling control apparatus as a product is reduced.

(2) Because the reference data Ds of the slip determination is automatically set, the problem of an error by manual input is eliminated.

(3) Because the reference data Ds of the slip determination is always updated in accordance with the current rotational speed ratio of the front and rear wheels, the slip determination accuracy is well maintained.

Furthermore, in the invention, when the slip determination means determines to be the slip, the travelling control apparatus of the compaction vehicle further comprises a rotational speed ratio control means for controlling travelling motors of the front and rear wheels so that the rotational speed ratio of the front and rear wheels is an adequate value.

According to the travelling control apparatus, in addition to the obtainment of the effects of the above (1) to (3), the rotational speed ratio of the front and rear wheels is an adequate value.

Furthermore, in the invention the compaction vehicle is a vibration compaction vehicle configured to vibrate at least one of the front and rear wheels and to compact ground, and when the slip determination means determines to be the slip, the travelling control apparatus of the compaction vehicle further comprises a vibration stop control means for stopping a vibration of the wheel being vibrated.

According to the travelling control apparatus, it is possible to avoid a vibration from being added to a specific place of ground during a slip in a vibration compaction vehicle, and furthermore, to prevent a driving force from being reduced by a vibration of a drive wheel. Because the vibration is automatically stopped, it is not necessary for an operator to operate any operation relating to vibration stop.

According to the invention, the travelling control apparatus is excellent in versatility in a same specification thereof, furthermore, in the apparatus the slip determination accuracy of the front and rear wheels is well maintained.

BEST MODE(S) FOR CARRYING OUT THE INVENTION

Figure 1:
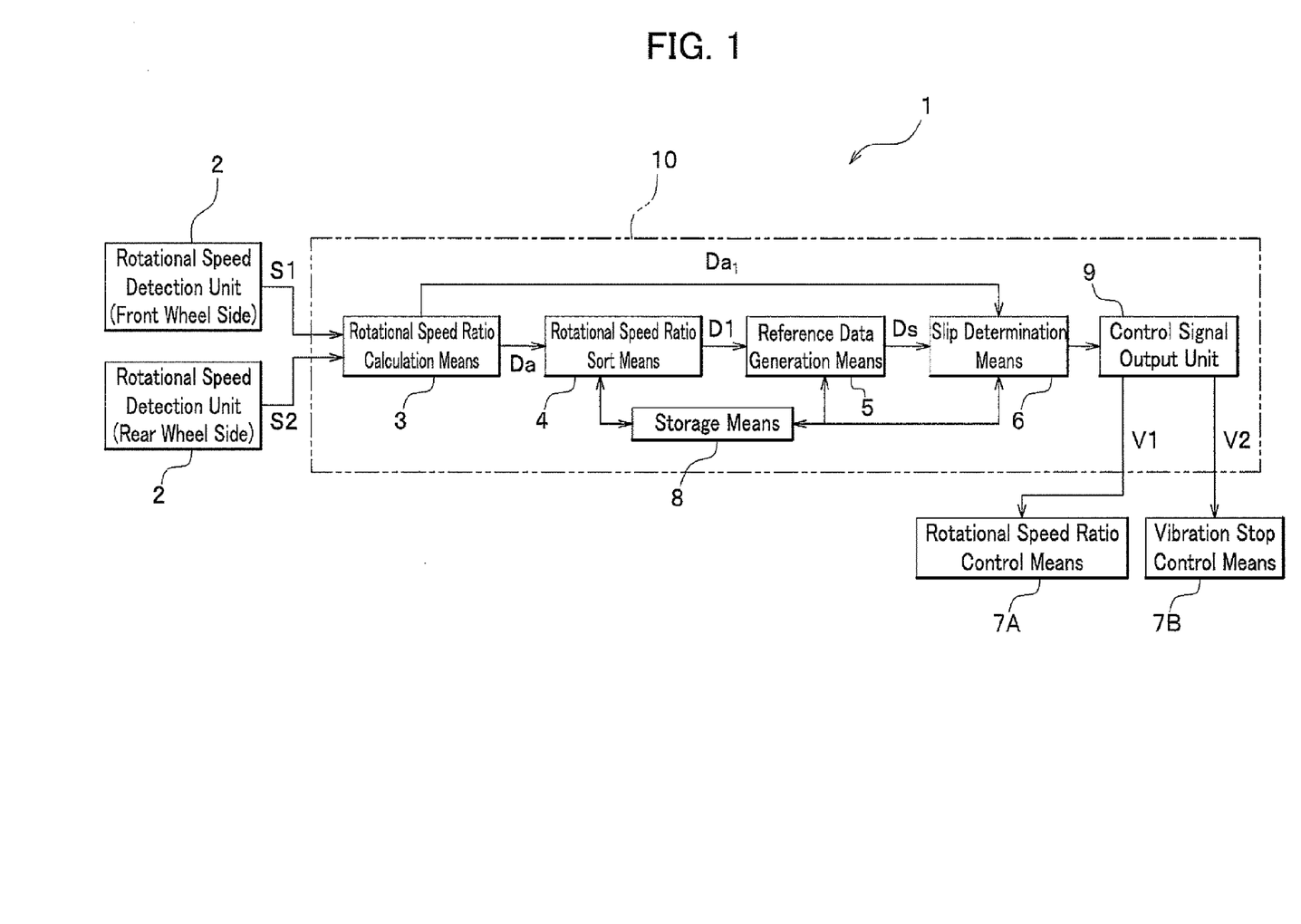
FIG. 1 is a block diagram of a travelling control apparatus relating to the present invention.
Figure 2:
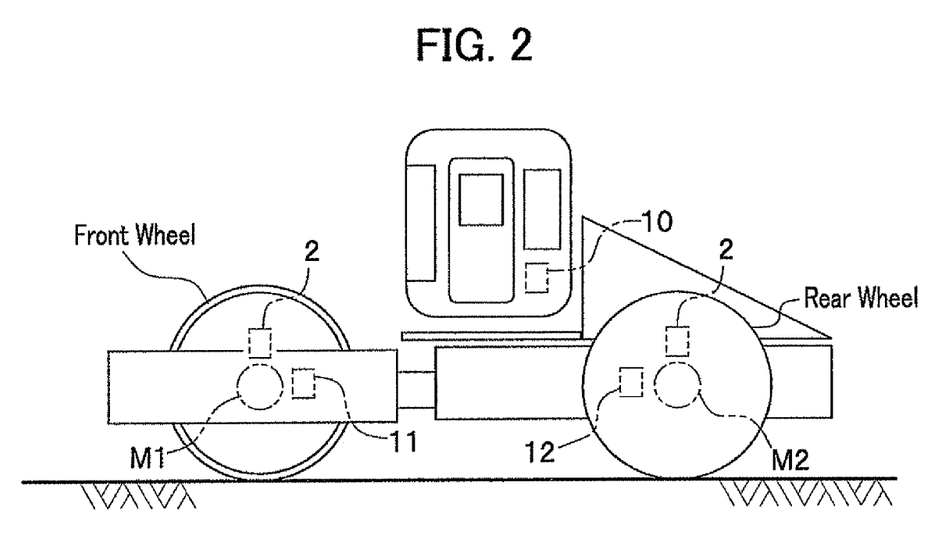
FIG. 2 is a side view showing an example of a layout of a travelling control apparatus in a compaction vehicle.
Figure 3:
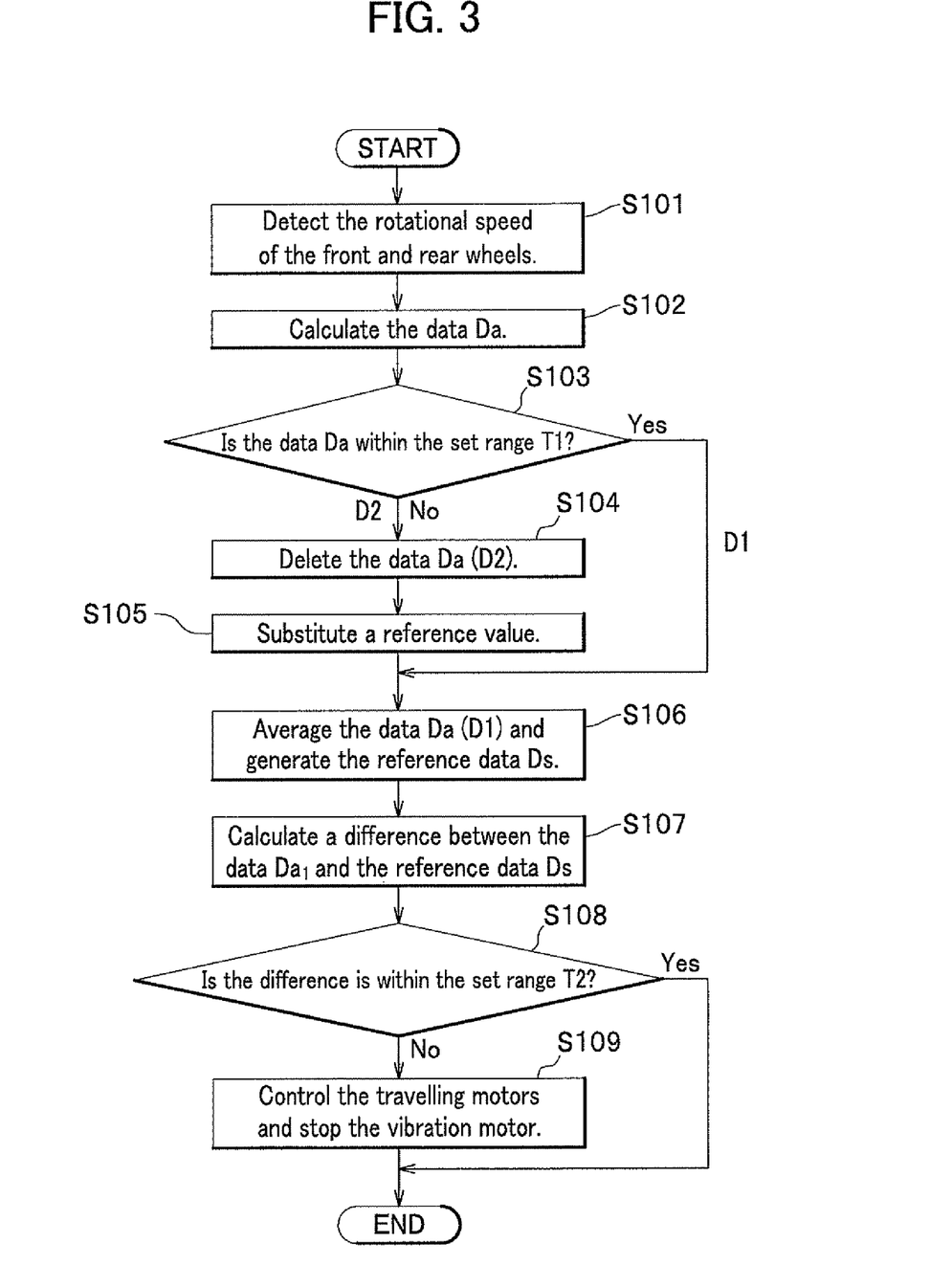
FIG. 3 is a flowchart of a control operation of a travelling control apparatus.

A travelling control apparatus relating to the present invention is mounted on a compaction vehicle for uneven ground tending to mainly occur in a slush. To an objective vehicle are attached various kinds of compaction rolls such as tires and a steel roll as a front wheel and a rear wheel; however, the invention does not depend on the kind and shape of the compaction rolls. FIG. 1 is a block diagram of a travelling control apparatus relating to the present invention; FIG. 2 is a side view showing an example of a layout of a travelling control apparatus in a compaction vehicle; and FIG. 3 is a flowchart of a control operation of a travelling control apparatus.

In FIG. 1 a travelling control apparatus 1 comprises: rotational speed ratio detection units 2 configured to detect each rotational speed of a front wheel and a rear wheel and to output a signal S1 of the rotational speed of the front wheel and a signal S2 of the rotational speed of the rear wheel; a rotational speed ratio calculation means 3 for inputting the signals S1, S2 and calculating data Da of a rotational speed ratio of the front and rear wheels; a rotational speed ratio sort means 4 for sorting the data Da into data D1 within a range of a set range T1 and data D2 out of the range thereof; a reference data generation means 5 for sampling and averaging the data D1, and generating an average value of the data D1 as reference data Ds; a slip determination means 6 for comparing data $Da_1$ of the rotational speed ratio of the front and rear wheels obtained from currently obtained signals S1, S2 with the reference data Ds, and in a case of the data $Da_1$ being out of a set range T2, for determining that one of the front and rear wheels is slipping; and a rotational speed ratio control means 7A for controlling travelling motors Ml, M2 (FIG. 2) of the front and rear wheels so that the rotational speed ratio of the front and rear wheels is an adequate value in a case of the slip determination means 6 determining to be the slip.

「Rotational speed Detection Unit」

As the rotational speed detection units 2, well known proximity sensors are cited such as an optical sensor and a magnetic sensor represented by a rotary encoder. These proximity sensors are attached inside the front wheel and the rear wheel, respectively, as shown in FIG. 2; however, an attachment mode thereof is not specifically limited if the rotational speeds of the front wheel and the rear wheel can be derived resultingly: as an example, to detect the rotational speeds of the travelling motors M1, M2; to detect the rotational speeds of gears of a reducer; and to detect a detected portion integrally rotating with the front wheel and the rear wheel. Respective proximity sensors of the front wheel and the rear wheel output the respective signals S1, S2.

「Rotational Speed ratio Calculation Means」

The rotational speed ratio calculation means 3 inputs the signals S1, S2 from the rotational speed detection units 2 at a predetermined sampling frequency and calculates the data Da of the rotational speed ratio of the front and rear wheels from the both signals.

「Rotational speed ratio Sort Means」

The rotational speed ratio sort means 4 sorts the data Da into the data D1 within the set range T1 and the data D2 out of the range thereof. For example, the set range T1 is set as follows: A timing when the travelling control apparatus 1 is activated is approximately a start time of a compaction, and at this start time, there exists not so often a situation where the front or rear wheels abruptly slip. Accordingly, the data Da calculated soon after the travelling control apparatus 1 is activated can be assumed to be a normal rotational speed ratio of the front and rear wheels which are not slipping. A width value itself of the set range T1 is fixed in advance, and a lower threshold and upper threshold thereof are set so that an average value of the data Da calculated soon after the travelling control apparatus 1 is activated is at a center of the set range T1. Of course, it may be acceptable to tentatively make a vehicle travel on ground, where a slip does not occur, just before a compaction and to sample the data Da in advance, and based on this, to set a lower threshold and upper threshold of an incipient set range T1. Thereafter, during the compaction, the rotational speed ratio sort means 4 periodically averages the data D1 and always updates the set range T1. That is, the rotational speed ratio sort means 4 averages the data D1 within the set range T1 set in a predetermined travelling (predetermined time) and makes the averaged data D1 the reference data Ds described later; the sort means 4 makes the reference data Ds to be at the center of the set range T1 and decides the set range T1 in a next predetermined travelling (predetermined time). Subsequently, the above is repeated. An update period of these pieces of data is appropriately decided.

For example, assuming that when the width value of the set range T1 is fixed as 0.4, an average value of the data Da calculated soon after the travelling control apparatus 1 is activated is 1.20, the set range T1 is set so that its lower threshold and upper threshold are 1.00 and 1.40, respectively, by making 1.20 the center of the set range T1, and the rotational speed ratio sort means 4 sorts the data Da into the data D1 from 1.00 to 1.40 and the other data D2. Then if an average value of the data D1 obtained at this time is 1.21, the set range T1 in a next predetermined travelling (predetermined time) is set so that its lower threshold and upper threshold are 1.01 and 1.41, respectively, by making 1.21 the center of the set range T1. Furthermore, in another compaction vehicle, when an average value of the data Da calculated soon after the travelling control apparatus 1 is activated is 1.10, the set range T1 is set so that its lower threshold and upper threshold are 0.90 and 1.30, respectively, according to a similar processing. Then if an average value of the data D1 obtained at this time is 1.09, the set range T1 in a next predetermined travelling (predetermined time) is set so that its lower threshold and upper threshold are 0.89 and 1.29, respectively, by making 1.09 the center of the set range T1. Thus if the lower threshold and upper threshold of the set range T1 are applied to be always updated, for example, even when an air pressure of a tire changes during a compaction for a long time, and an effective diameter of the tire changes, and the rotational speed ratio of front and rear wheels changes, it is possible to set a lower threshold and an upper threshold comparable to the changed rotational speed ratio.

Furthermore, when a value of a rotational speed ratio of each compaction vehicle which is a mount objective of the travelling control apparatus 1 is not different so much, the set range T1 may be fixed. For example, when the value of a rotational speed ratio of a compaction vehicle where the rotational speed ratio is smallest is 1.10, and the value of a rotational speed ratio of a compaction vehicle where the rotational speed ratio is largest is 1.20, a lower threshold and upper threshold of the set rang T1 are fixed as 0.90 and 1.40, respectively.

By intervening the set range T1 thus described and deleting an abnormal rotational speed ratio data generated mainly by the slip of the front or rear wheels, it is possible in generating subsequent reference data Ds to generate data not including an unexpected factor such as a slip.

「 Reference Data Generation Means」

The reference data generation means 5 averages the data D1 within the set range T1 and generates the averaged data D1 thereof as the reference data Ds. Here, when the data D2 exists in the data detected by the rotational speed ratio sort means 4, the reference data generation means 5 substitutes predetermined reference data instead of the data D2 and averages data. The predetermined reference value is a value set in advance, and as an example, the reference data Ds in a previous predetermined travelling (predetermined time) is cited. For example, when a wheel slips and all of the data Da is the data D2 in the rotational speed ratio sort means 4, the reference data generation means 5 averages the reference data Ds in the previous predetermined travelling (predetermined time) (that is, the reference data Ds itself in the previous predetermined travelling (predetermined time)). Thus, "averages the data D1 within the set range T1" in the reference data generation means 5 of the invention includes a case of making an average coupled with such a substituted reference value when the data D2 exists.

In addition, with respect to the embodiment, in a storage means 8 is appropriately stored each data processed in the rotational speed ratio sort means 4 and the reference data generation means 5; data exchanges such as between the sort means 4 and the generation means 5, and between the generation means 5 and the slip determination means 6 are performed through the storage means 8.

Slip Determination Means

The slip determination means 6 compares the data $Da_1$ of the rotational speed ratio of the front and rear wheels calculated from the currently obtained signals 51, S2 by the rotational speed ratio calculation means 3 with the reference data Ds, and determines that one of the front and rear wheels is slipping in a case of the data $Da_1$ being out of the set range T2. The set range T2 is a tolerance for deeming a slip non slip if it is a slight slip, and is appropriately set with making the reference data Ds a center of the range T2. A width value itself of the set range T2 is fixed in advance, the reference data Ds is made the center of the range T2, and a lower threshold and upper threshold of the range T2 are set. For example, when the width value of the set range T2 is fixed as 0.4 and a value of the reference data Ds is 1.20, the range T2 is set with making 1.20 its center, and making its lower threshold and upper threshold 1.00 and 1.40, respectively. It is not always necessary to make the width value of the set range T2 and that of the set range T1 an equal value.

When one of the front and rear wheels is determined to be slipping by the slip determination means 6, a control signal V1 is output to the rotational speed ratio control means 7A from a control signal output unit 9. The rotational speed ratio calculation means 3, the rotational speed ratio sort means 4, the reference data generation means 5, the slip determination means 6, the storage means 8, and the control signal output unit 9 thus described are configured as one control unit 10 and are installed in such a driver's cabin as shown in FIG. 2.

「 Rotational-Speed ratio Control Means」

Figure 4:
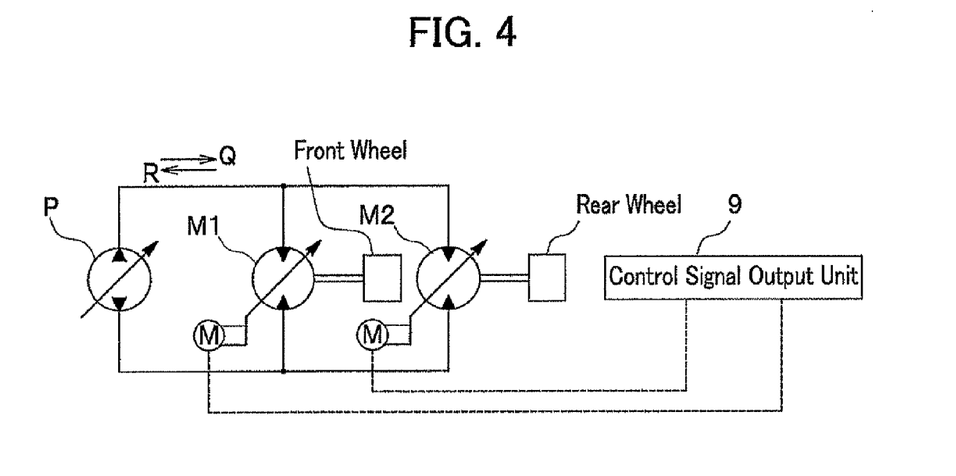
FIG. 4 is a hydraulic circuit diagram relating to a travelling system.

The rotational-speed ratio control means 7A inputs the control signal V1 and controls the travelling motors M1, M2 (FIG. 2) so that the rotational speed ratio of the front and rear wheels is an adequate value. Of course, the adequate value is a value of the rotational speed ratio where a slip is not generated. FIG. 4 is a hydraulic circuit diagram relating to a travelling system. A symbol P is a hydraulic pump driven by an engine, and for example, the pump consists of a swash plate variable displacement pump. The travelling motor M1 on a front wheel side and the travelling motor M2 on a rear wheel side consist, for example, of a swash plate variable displacement motor, and are connected in parallel to the hydraulic pump P. Hydraulic oil flows in a Q-direction or an R-direction, and thereby, a compaction vehicle moves forward or backward.

In the slip determination means 6 of FIG. 1, when the data $Da_1$ is out of an upper threshold of the set range T2 and this is a case of the front wheel being slipping, the control signal output unit 9 outputs the control signal V1 to a displacement variable actuator of the travelling motor M1 so that a displacement of the travelling motor M1 is small in FIG. 4. Thereby, hydraulic oil meaninglessly supplied only to the travelling motor M1 of the front wheel with bias is regulated, and supply of pressurized oil to the travelling motor M2 of the rear wheel which is not slipping is restarted; thereby, a traction capacity of the rear wheel is increased, and the compaction vehicle travels through a current place, and resultingly, the slip state of the front wheel is eliminated. Similarly in the slip determination means 6 of FIG. 1, when the data $Da_1$ is out of a lower threshold of the set range T2 and the rear wheel is slipping, the control signal output unit 9 outputs the control signal V1 to a displacement variable actuator the travelling motor M2 so that a displacement of the travelling motor M2 is small in FIG. 4, and thereby, the slip state of the rear wheel is eliminated. In an example thus described, the actuators configured to change the displacements of the travelling motors M1, M2 configure the rotational speed ratio control means 7A.

Figure 5:
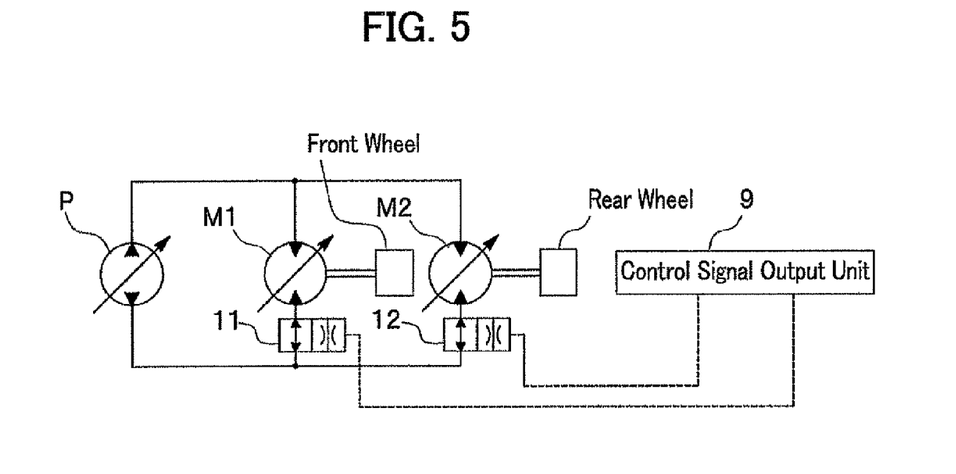
FIG. 5 is a hydraulic circuit diagram relating to a travelling system in a case of a flow throttle valve being provided.

FIG. 5 is a hydraulic circuit diagram in a case of flow throttle valves 11, 12 being provided, respectively, in flow passages to the travelling motors M1, M2. The flow throttle valves 11, 12 shown in FIG. 5 consist of a control two-position two-port valve having two patterns without throttle and with throttle, and both are usually positioned on a side without throttle. When the front wheel is slipping, the control signal output unit 9 outputs the control signal V1 to the flow throttle valve 11, and thereby, the valve 11 is changed to a side with throttle. Thus hydraulic oil meaninglessly supplied only to the travelling motor M1 of the front wheel with bias is regulated, and the supply of pressurized oil to the travelling motor M2 of the rear wheel which is not slipping is restarted; thereby, the traction capacity of the rear wheel is increased, and the compaction vehicle travels through a current place, and resultingly, the slip state of the front wheel is eliminated. When the rear wheel is slipping, the control signal output unit 9 outputs the control signal V1 to the flow throttle valve 12, thereby the valve 12 is changed to a side with throttle, a flow rate of hydraulic oil to the travelling motor M2 is regulated, and the slip state of the rear wheel is eliminated. According to this example, the flow throttle valves 11, 12 configure the rotational speed ratio control means 7A, and the travelling motors M1, M2 are not always required to be a variable displacement motor. In addition, a flow throttle valve is achieved by not only two patterns with throttle and without throttle but also a multistage or continuously variable throttle valve.

「Vibration Stop Control Means」

The vibration stop control means 7B is an effective means when a compaction vehicle is a vibration compaction vehicle configured to vibrate at least one of the front and rear wheels and to compact ground. In addition, as an example of a vibration apparatus mounted in a roll (also possible in a tire), the apparatus described in Japanese Patent Laid-Open Publication No. H07-150516 is cited.

When a front wheel or a rear wheel enters in a soft place such as a slush during a compaction on uneven ground, and slips, if a vibration is continued to be given to the wheel as it is, the wheel begins to sink in the slush by a vibration force, and it becomes difficult to escape from the slush. Furthermore, with respect to the wheel out of the slush, there is a problem that the wheel strongly compact a same point by the vibration during the slip. Conventionally, when a slip occurs, an to operator manually turns off a vibration switch; however, performing such a switch operation separately is a troublesome work, and it may also be thought for an unaccustomed operator to be diverted by the slip and to forget to turn off the vibration switch. Furthermore, if a drive wheel is vibrating, a driving force of the vibration compaction vehicle may be reduced in some cases.

Figure 6:
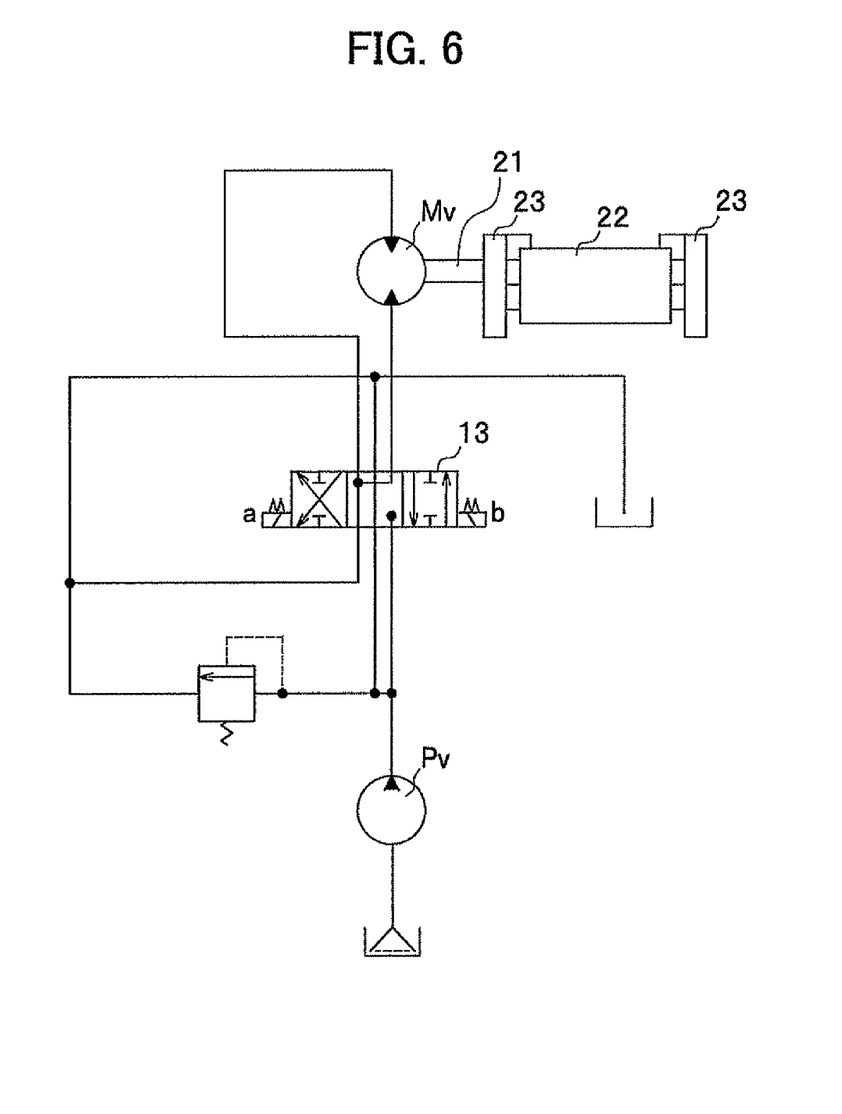
FIG. 6 is a hydraulic circuit diagram relating to a vibration system of a roll.

With respect to this problem, the vibration stop control means 7B inputs a control signal V2 from the control signal output unit 9 when the slip determination means 6 determines to be the slip, and automatically stops the vibration of the wheel which is vibrating. As an example of this control, a control of stopping a vibration motor for rotating a vibratory shaft is cited. FIG. 6 is a hydraulic circuit diagram relating to a vibration system of a wheel (roll). A symbol Pv shows a hydraulic pump; a symbol Mv shows a vibration motor which can rotate normally and reversely according to a difference of a flow direction of hydraulic oil; and a symbol 13 is a directional control valve. In a case of FIG. 6, a vibration apparatus in the roll is applied to be able to select any one of a low amplitude vibration and high amplitude vibration according to a difference of a rotation direction of a vibratory shaft 21. As an example, when the vibratory shaft 21 rotates in one direction, directions of excursions of a pair of movable eccentric weights 23 are reverse with respect to a fixed eccentric weight 22, vibration forces act in cancelling directions with each other, and the vibration is in a state of a low amplitude; when the vibratory shaft 21 rotates in the other direction, the directions of excursions of the pair of movable eccentric weights 23 match with respect to the fixed eccentric weight 22, vibration forces are combined, and the vibration is in a state of a high amplitude. A directional control valve 13 is a three-position and four-port valve which shuts off supply of hydraulic oil to the vibration motor Mv at a center position of the valve 13, and which changes a flow direction of the hydraulic oil to the motor Mv by being changed to any one of left and right.

In the slip determination means 6 of FIG. 1, when the data $Da_1$ is out of the upper threshold of the set range T2 and this is a case of the front wheel being slipping, the control signal output unit 9 outputs the control signal V2 to the directional control valve 13 (FIG. 6), the valve 13 at any one of left and right valve positions is changed to the center position, the supply of hydraulic oil to the vibration motor Mv is stopped, and the vibration of the roll stops. In the slip determination means 6 of FIG. 1, similarly when the data $Da_1$ is out of the lower threshold of the set range T2 and the rear wheel is slipping, the control signal output unit 9 outputs the control signal V2 to the directional control valve 13 (FIG. 6), the valve 13 at any one of left and right valve positions is changed to the center position, the supply of hydraulic oil to the vibration motor Mv is shut off, and the vibration of the roll stops. In this example the directional control valve 13 configures the vibration stop control means 7B.

A control operation of the travelling control apparatus 1 will be described with reference to the flowchart of FIG. 3, and specific components will be described with reference to other drawings as needed. The travelling control apparatus 1 activated detects the rotational speeds of the front and rear wheels (step S101), calculates the data Da of the rotational speed ratio of the front and rear wheels from the both rotational speeds detected (step S102), and determines whether or not the data Da is within the set range T1 (step S103). When the data Da is within the set range T1 (Yes in the step S103), the travelling control apparatus 1 averages the data Da (D1) and generates the reference data Ds (step S106). When the data Da is out of the set range T1 (No in the step S103), the travelling control apparatus 1 deletes the data Da (D2) out of the set range T1 (step S104), substitutes a reference value (step S105), and moves to a step S106. In this case, in the step S106 the to travelling control apparatus 1 averages the reference value in stead of the data D1, and generates the reference data Ds.

Next, the travelling control apparatus 1 calculates a difference between the data $Da_1$ of a current rotational speed ratio of the front and rear wheels and the reference data Ds generated in the step S106 (step S107), and determines whether or not the difference is within the set range T2 (step S108). When the difference is within the set range T2 (Yes in the step S108), the travelling control apparatus 1 completes the control operation. When the difference is out of the set range T2 (No in the step S108), the travelling control apparatus 1 controls the travelling motors M1, M2 (FIG. 2) of the front and rear wheels so that the rotational speed ratio of the front and rear wheels is an adequate value; when the apparatus 1 comprises the vibration stop control means 7B, the apparatus 1 also stops the vibration motor Mv (step S109).

Thus described, according to the travelling control apparatus 1 comprising: the rotational speed ratio detection units 2 configured to detect respective rotational speeds of the front and rear wheels and to output the signals S1, S2 of the rotational speeds; the rotational speed ratio calculation means 3 for calculating the data Da of the rotational speed ratio of the front and rear wheels from the signals S1, S2; the rotational speed ratio sort means 4 for sorting the data Da into the data D1 within the range of the set range T1 and the data D2 out of the range thereof; the reference data generation means 5 for averaging the data D1 and generating the average value of the data D1 as the reference data Ds; and the slip determination means 6 for comparing the data $Da_1$ of the rotational speed ratio of the front and rear wheels obtained from the currently obtained signals S1, S2 with the reference data Ds, and in a case of the data $Da_1$ being out of the set range T2, to determine that one of the front and rear wheels is slipping, the following effects are obtained:

(1) Because the reference data Ds of a reference of the slip determination is automatically set in accordance with the rotational speed ratio of the front and rear wheels, the travelling control apparatus 1 of a same specification can be applied to a compaction vehicle whose rotational speed ratio of front and rear wheels is different. Thus, a management manpower of the travelling control apparatus 1 as a product is reduced.

(2) Because the reference data Ds of the slip determination is automatically set, the problem of an error by manual input is eliminated.

(3) Because the reference data Ds of the slip determination is always updated in accordance with the current rotational speed ratio of the front and rear wheels, the slip determination accuracy is well maintained.

Furthermore, according to a configuration that when the slip determination means 6 determines to be the slip, the travelling control apparatus 1 further comprises the rotational speed ratio control means 7A for controlling the travelling motors M1, M2 of the front and rear wheels so that the rotational speed ratio of the front and rear wheels is an adequate value, the rotational speed ratio of the front and rear wheels is the adequate value in addition to the obtainment of the effects of the above (1), (2), and (3).

Furthermore, according to a configuration that when a compaction vehicle is a vibration compaction vehicle which vibrates at least one of front and rear wheels and compacts ground, the travelling control apparatus 1 further comprises the vibration stop control means 7B for stopping the vibration of the wheel which is vibrating in a case of the slip determination means 6 determining to be the slip, it is possible to avoid a vibration from being added to a specific place of ground during the slip, and because the vibration is automatically stopped, it is not necessary for an operator to operate any manual operation relating to vibration stop. Furthermore, it is also possible to prevent a driving force from being reduced by the vibration of a drive wheel being stopped.

Thus, the best mode for carrying out the invention has been described. The invention is not limited to matters shown in the drawings, and can be modified and changed within the spirit and scope of the invention. For example, in the requirement of the vibration stop control means, the invention suffices to possess a configuration of stopping the vibration of any of front and rear wheels, and is not limited to the system of stopping the vibration motor described. As an example, such a system is cited that stops the vibration wheel by adjusting the position of a movable eccentric weight and controlling an eccentricity amount of a vibratory shaft to be zero.

The invention claimed is:

1. A travelling control apparatus of a compaction vehicle for compacting ground, the apparatus comprising:

rotational speed detection units configured to detect respective rotational speeds of front and rear wheels and to output rotational speed signals (S1, S2) of the rotational speeds of the front and rear wheels;

a rotational speed ratio calculation means for calculating a rotational speed ratio of the front and rear wheels from the rotational speed signals (S1, S2);

a rotational speed ratio sort means for sorting data (Da) corresponding to the rotational speed ratio of the front and rear wheels into first data (D1) within a first set range (T1) and second data (D2) out of the first set range;

a reference data generation means for averaging the first data (D1) and generating an average value of the first data (D1) as reference data (Ds); and a slip determination means for comparing a currently obtained data ($Da_j$) of the data (Da) corresponding to the rotational speed ratio of the front and rear wheels calculated from currently obtained rotational speed signals (S1, S2) by the rotational speed ratio calculation means with the reference data (Ds), and in a case of the currently obtained data ($Da_j$) being out of a second set range (T2), for determining that one of the front and rear wheels is slipping, wherein the reference data (Ds) is a center of the second set range (T2).

2. The travelling control apparatus according to claim 1 further comprising a rotational speed ratio control means for controlling respective travelling motors of the front and rear wheels so that, when the slip determination means determines that one of the front and rear wheels is slipping, the respective travelling motors are controlled so that the rotational speed ratio of the front and rear wheels has a value at which a slipping is eliminated.

3. The travelling control apparatus according to claim 1, wherein the compaction vehicle is a vibration compaction vehicle configured to vibrate at least one of the front and rear wheels and to compact the ground, and wherein the travelling control apparatus further comprises a vibration stop control means for stopping a vibration of the wheel being vibrated when the slip determination means determines that one of the front and rear wheels is slipping.

4. The travelling control apparatus according to claim 2, wherein the compaction vehicle is a vibration compaction vehicle configured to vibrate at least one of the front and rear wheels and to compact the ground, and wherein the travelling control apparatus further comprises a vibration stop control means for stopping a vibration of the wheel being vibrated when the slip determination means determines that one of the front and rear wheels is slipping.

* * * * *